Figure 1:
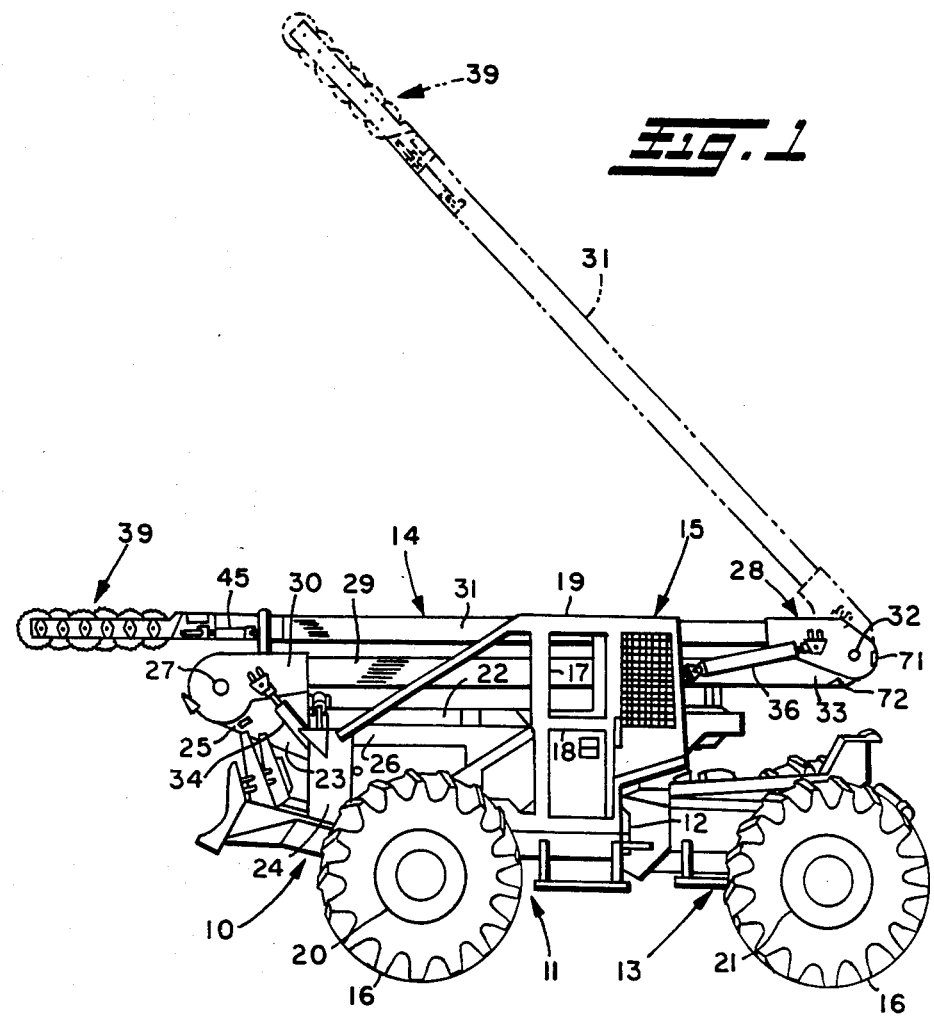

United States Patent [19]

Dixon

[11] Patent Number: 4,627,227
[45] Date of Patent: Dec. 9, 1986

[54] RIGHT-OF-WAY TREE LINE TRIMMER

[76] Inventor: Raymond E. Dixon, Box 59, Broaddus, Tex. 75929

[21] Appl. No.: 715,706

[22] Filed: Mar. 25, 1985

Related U.S. Application Data

[63] Continuation of Ser. No. 435,718, Oct. 21, 1982, abandoned.

[51] Int. Cl.⁴ ............................................ A01D 55/18
[52] U.S. Cl. .................................................. 56/235
[58] Field of Search ............ 56/235, 233, 237, 328 R; 144/2 Z, 34 R

[56] References Cited

U.S. PATENT DOCUMENTS

| | | | |
|---|---|---|---|
| 2,940,539 | 6/1960 | Richey | 56/328 R |
| 3,138,911 | 6/1964 | Pounds | 56/235 |
| 3,157,016 | 11/1964 | Leydig et al. | 56/235 |
| 3,192,695 | 7/1965 | Leydig et al. | 56/235 |
| 3,464,195 | 9/1969 | Crichfield | 56/328 R |
| 3,605,392 | 9/1971 | Fossum | 56/237 |
| 3,878,957 | 4/1975 | Rempel | 56/328 R |
| 4,067,178 | 1/1978 | Miller | 56/235 |
| 4,355,497 | 10/1982 | Murphy | 56/235 |

*Primary Examiner*—Jay N. Eskovitz

[57] ABSTRACT

A tree line trimmer which includes a boom assembly with a lower boom and upper boom pivotally connected for movement in a common plane. An elongated cutter head is mounted to the outer boom and includes a plurality of overlapping, rotatable saw blades.

11 Claims, 9 Drawing Figures

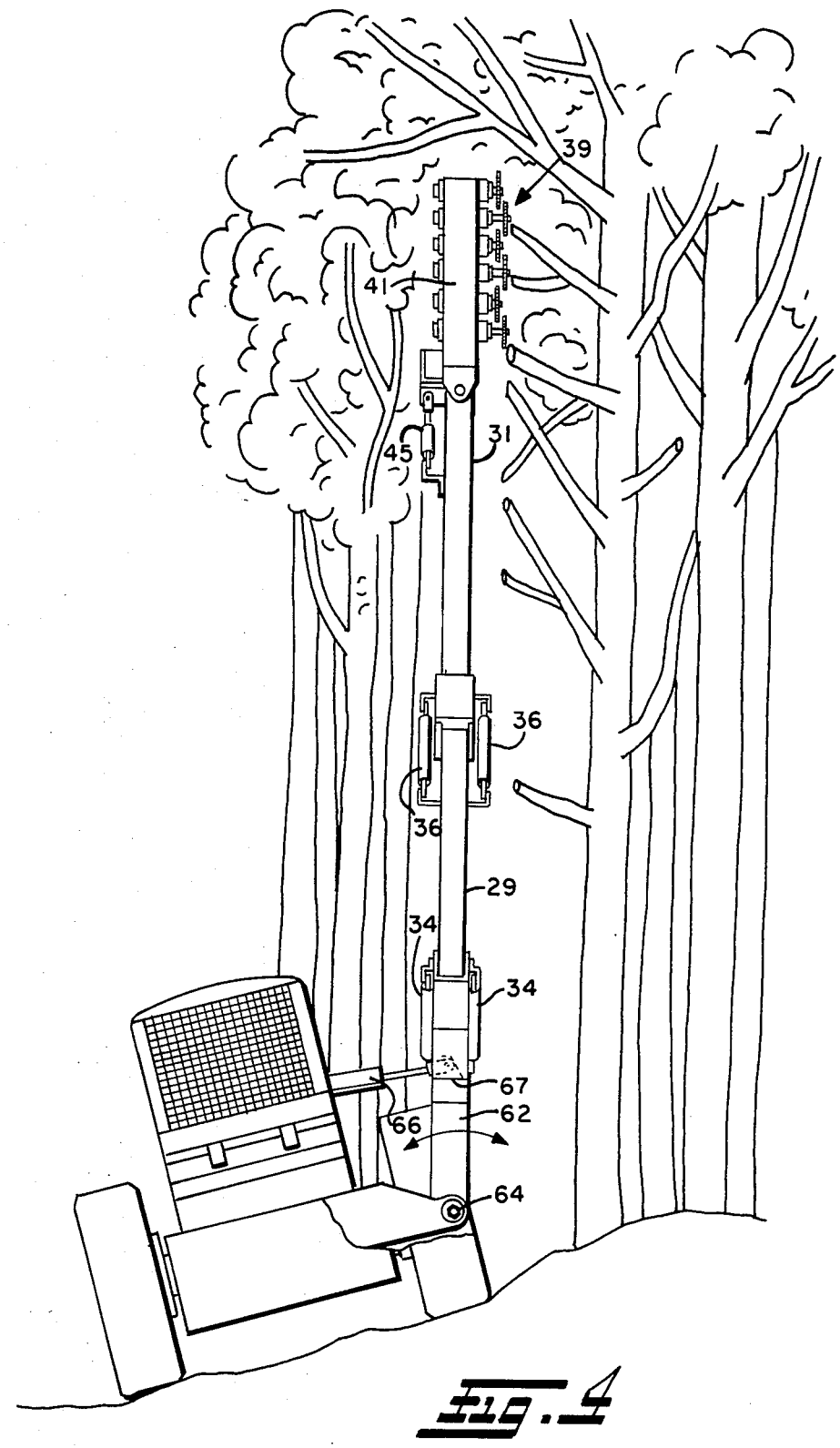

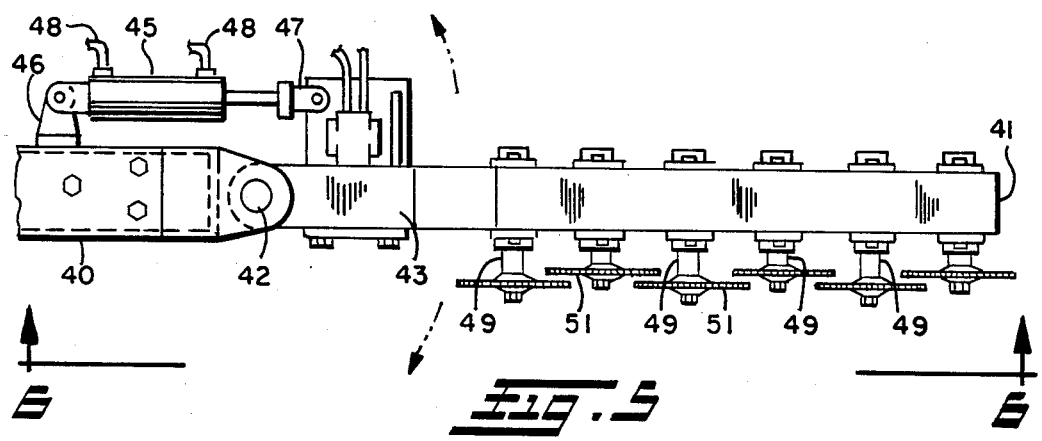
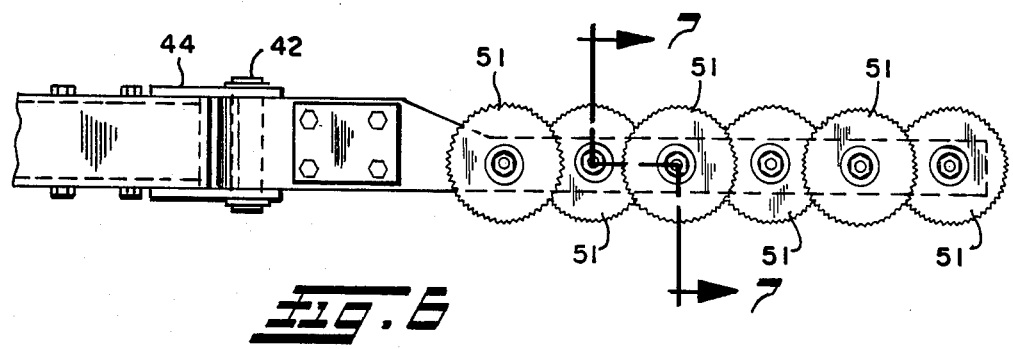
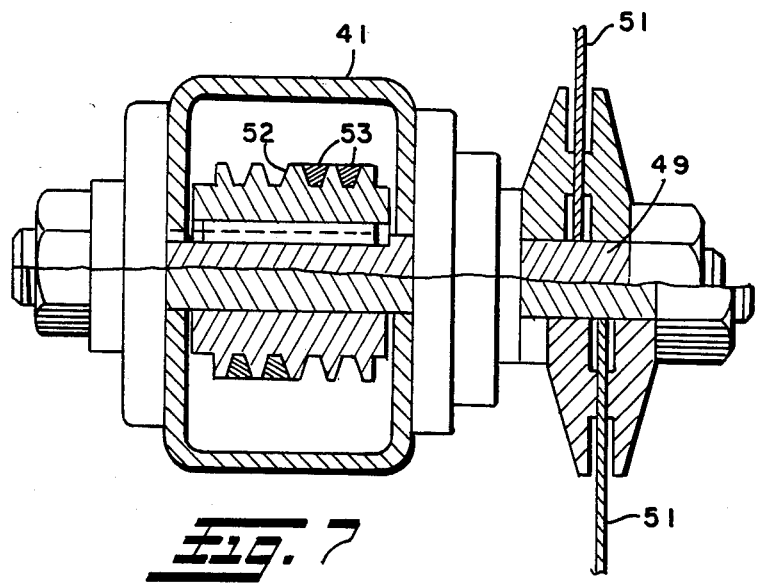

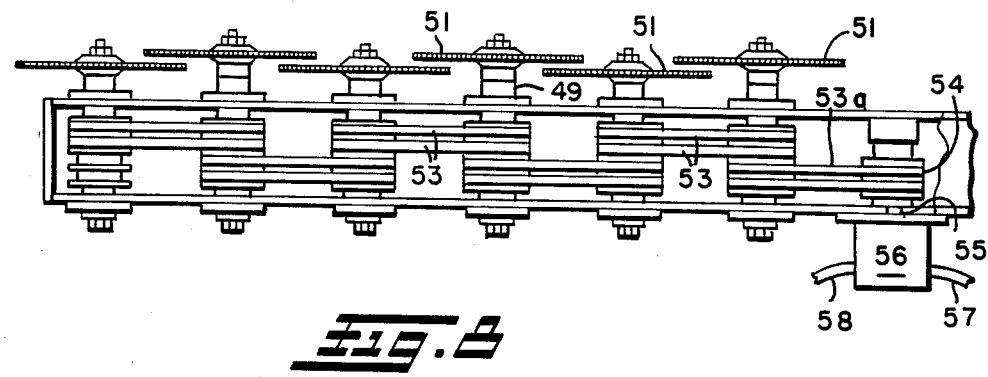
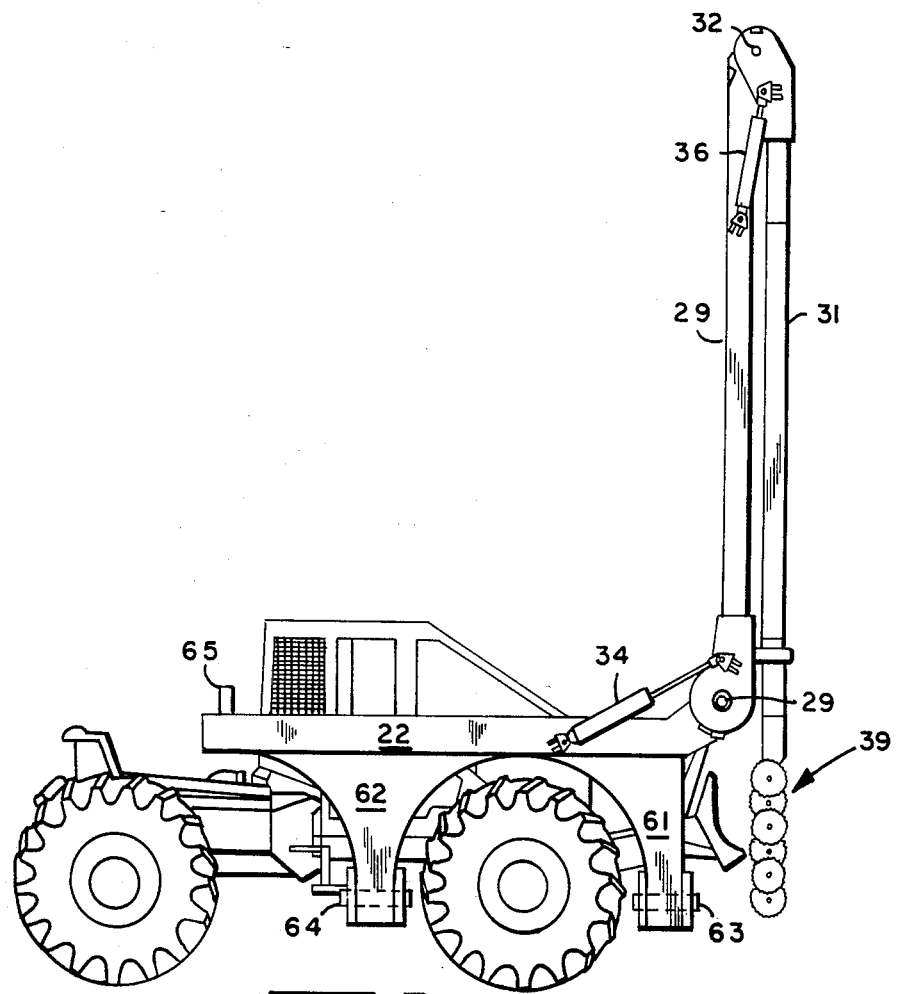

RIGHT-OF-WAY TREE LINE TRIMMER

This application is a continuation of U.S. Application Ser. No. 435,718, filed Oct. 21, 1982, now abandoned.

This invention relates to a right of way tree line trimmer for shearing branches and limbs from standing trees along rural power line right of ways.

In the past most tree trimming along right of ways has been done with trucks with limited off road mobility having a boom which carries at its end a gondola or "cherry picker". The gondola is positioned adjacent to the tree line and a man in the gondola or "cherry picker" utilizes a chain saw to sever the branches and limbs along the tree line. This procedure is expensive, time consuming and dangerous to the operator of the vehicle as well as the operator of the chain saw.

In accordance with this invention, a motorized vehicle has a cab for the operator and a articulated boom mounted at the front end of the vehicle. The end of the boom carries a plurality of circular saws and by pivoting the boom sections vertically relative to the vehicle and to each other the operator of the vehicle is able to cut a swath of branches or limbs from substantially at ground level to a height of over 50 feet along the face of the right of way. It has been found that the one operator of the tree trimmer of this invention can equal or better the production of three two-man crews operating three vehicles with gondolas and chain saws.

Accordingly it is an object of the present invention to provide a limb and branch severing aparatus which may be operated from a remote position by the operator on a vehicle to sever the face of the tree line along a power line right of way.

Another object of the invention is to provide a tree trimming vehicle which is relatively inexpensive to manufacture, durable in structure and efficient in operation.

Another object of the present invention is to provide a tree trimming vehicle which requires no great skill to operate and which will eliminate the need for elevating a person into the vicinity of a limb to be severed.

A further object of the present invention is to provide a boom mounted gang of overlapping circular saw blades which cut a relatively wide swath of limbs and branches in one stroke of the boom.

Another object of the invention is to provide a boom mounted gang saw for cutting the tree line along power right of ways which is capable of cutting the face of the tree line in a substantially verticle plane even though the vehicle may be moving or positioned on the side of a hill or incline.

Other objects and advantages of the present invention will become apparent from the following description when taken in conjunction with the accompanying drawings wherein the characters of reference designate corresponding parts throughout the several views.

FIG. 1 of the drawings is a side elevation of the vehicle of the tree trimmer of this invention showing the boom and its lower most position and showing in phantom lines the upper boom in a raised position.

Figure 2:
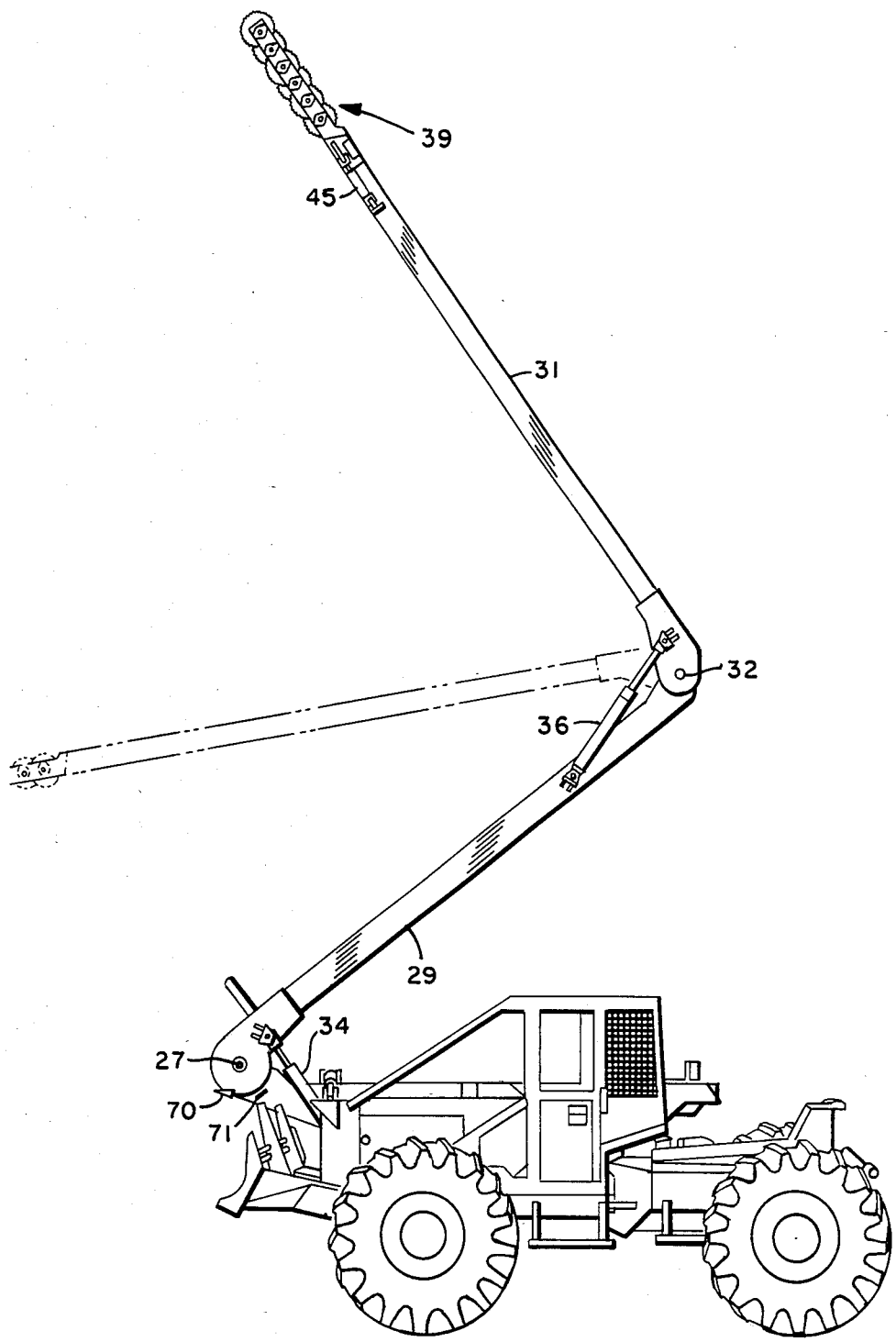

FIG. 2 of the drawings is a side elevational view showing both booms in a raised position.

Figure 3:
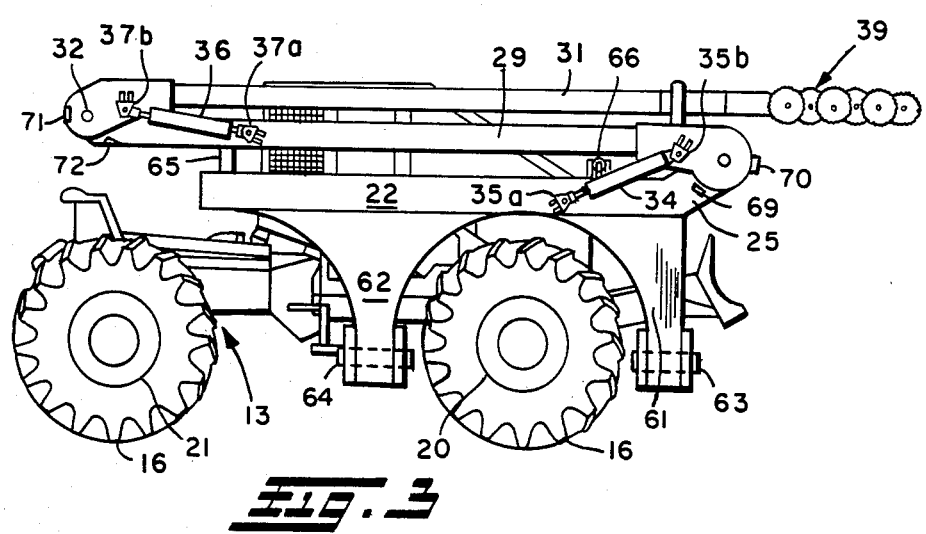

FIG. 3 of the drawings is a side elevational view showing the boom in a lower most position but viewed at the side opposite to FIG. 1.

FIG. 4 of the drawings is a rear elevational view of the tree trimmer of this invention positioned on the side of a hill with the boom moved to a verticle position.

FIG. 5 of the drawings is a plan view of the cutter head.

FIG. 6 of the drawings is a side elevational of the cutter head.

FIG. 7 of the drawings is a cross sectional view of the saws taken along the lines 7—7 of FIG. 6.

FIG. 8 of the drawings is a plan view of the cutter head with the housing broken away showing the drive train to each of the saws.

FIG. 9 is a view similar to FIG. 3 but with the lower boom raised.

The tree line trimmer constructed in accordance with the present invention includes an articulated vehicle 10 having a front section 11 which is pivotally connected at 12 with a rear or trailing section 13. The vehicle 10 forms a base upon which the tree trimming assembly is disposed. An operator's cab is mounted on the front section of the vehicle 10.

The vehicle 10 is self-propelled with a wide track of approximately 90 inches and a long wheel base of approximately 12 feet and a ground clearance at the axle housing and at pivot point 12 of approximately 20 inches. Wide 62 inch diameter logger tires 16 provide excellent ground support and all weather traction. The weight, width and wheel base of the vehicle 10 combine to provide excellent stability without outriggers and the vehicle is capable of moving over rough terrain.

The cab 15 is mounted on the front section 11 and is generally made of a box-like construction having a plurality of uprights 17 connected at their upper ends by crossmembers 18 which supports a Lexan domed roof providing the operator with good visibility both horizontally and vertically and protection from falling debris. The cab is mounted on the rear portion of the front section 11 so that it is positioned approximately over the pivot 12 which in turn is positioned approximately midway between the wheel axles 20, 21.

The tree trimming assembly 14 includes a base 22 having an extension 23 which projects well forward of the front portion 24 of the vehicle section 11 and in an upward direction so that the terminal end 25 is positioned above the upper portion 26 of the front section 11 of the vehicle to provide a first axis 27 for the articulated or knuckle boom 28. The knuckle boom 28 includes a lower boom 29 pivoted about the first axis 27 at its lower end 30 and an upper boom 31 which is pivoted about a second axis 32 located at the upper end 33 of the lower boom 29. As shown in the drawings, the lower boom 29 and upper boom 31 are preferably of substantially equal and the combined length thereof is at least twice the length of the vehicle 10 so that the combined lengths thereof is over 50 feet.

The lower boom 29 is moved about the first axis 27 by means of a pair of hydraulic cylinders 34 each pivotally attached at one end to a bracket 35a attached to the base 22 and at the other end to a bracked 35b attached to the lower boom 29 adjacent the lower end 30 thereof. The upper boom 31 is pivoted about the second axis 32 by a pair of hydraulic cylinders 36 pivotally connected to a bracket 37a on the lower boom 29 and at the upper end to a bracket 37b attached to the upper boom 31 adjacent the second axis 32. The pair of cylinders 34 may be actuated by hydraulic fluid supplied through hoses 38a independently of the cylinders 36 which is supplied with hydraulic fluid through hoses 38b and controlled by the operator as will be more fully described hereinafter.

Each of the booms 29 and 31 are preferably substantially square in cross-section and are hollow. Also, the central portion of each boom for a substantial distance of the length of each boom is constructed of fiberglass reinforced plastic so that the operator is fully protected against short circuiting should the boom touch an overhead wire.

A cutter head 39 is mounted at the upper end 40 of the upper boom 31. The cutter head 39 includes a bar 41 having a pivot 42 at the inboard end 43 which is mounted on similar pivots 44 at the upper end 40 of the boom 31 so that the bar may be moved by actuation of the cylinder 45 in the plane of the boom 31. The cylinder 45 is pivotably connected to a bracket 46 attached to the upper end of the boom 31 and at the other end to a bracket 47 attached to the bar 41. Hydraulic fluid is supplied to the cylinder 45 by hoses 48. Upon actuation of the cylinder 45, the cutter blade 39 may be pivoted into or away from the face of the tree line to prune individual limbs that may extend in various directions.

The bar 41 is provided with a plurality of arbors or shafts 49 mounted on bearings 50 which are equally spaced along the length of the bar 41 and parallel to each other in the same plane. Each shaft 49 is provided with a circular saw blade 51 which is offset axially from the adjacent blades. The saw blade shafts 49 are each provided with a pair of dual V-belt pulleys 52 secured to the shafts 49 and driven by pair of V-belts 53. Each pair of V-belts 53 connect the shafts 49 in series and the V-belts 53a on the shaft 49a are reeved around a dual V-belt pulley 54 secured to the shaft 55 of a hydraulic motor 56 which is supplied with pressurized fluid by suitable hoses 57, 58 passing internally through the upper boom 31 and lower boom 29 to a hydraulic pump mounted on the vehicle 10.

The saw blades 51 are mounted on a shaft 49 in offset relationship to the next adjacent saw blade so that the blades are positioned in overlapping but staggered tandem overlapping relationship. The blades preferably have a wide diameter of 16 inches and preferably six saw blades are provided to form an effective cutting length of over five feet. Furthermore, all of the blades 51 extend above and below the upper and lower edges 59 and 60 of the bar 41 for approximately ½ the radius of the blades so that limbs up to four or five inches thick may be cut by vertical movement of the cutter head in either the up or down direction. The long effective cutting length of the "ganged" saws and the capability of cutting limbs by movement of the cutter head 39 in either the up or down direction results in greatly increased productivity.

In accordance with a feature of the present invention, the tree trimmer base 22 is movable about an axis longitudinally of the vehicle 10 to provide for pivotal movement of the tree trimming assembly 14 to either side of vertical on the longitudinal fore and aft axis. The tree trimmer base 22 includes two downwardly extending projections 61 and 62 which terminate in front of and behind the front and back of the front tire 16. Each extension 61 and 62 includes a pivot 63 and 64 which form a pivot axis extending longitudinally of the vehicle 10. At the rear end of the base 22 an upwardly projecting support 65 is provided on which the lower boom rests when it is in its lowermost position as shown in FIG. 1. A cylinder 66 is connected to the upper surface 67 of the base 22 at one end and the other end of the cylinder is connected to the engine hood 68 of the vehicle. Upon actuation of the cylinder 66 the tree trimmer base 22, the lower boom 29, upper boom 30 and the cutter head 39 may be moved about the axis formed by the pivots 63 and 64 approximately 15 degrees to either side of vertical. This feature of the invention enables the operator to cut the face of the tree line in a substantially vertical plane when the vehicle is located on the side of a hill, for example, as shown in FIG. 4. This feature also aids in trimming limbs which may extend above and across the power line by cutting such limbs in sections and progressing inwardly towards the trunk of the tree simply by successive movement of the tree trimmer base 22 around the pivots 63 and 64.

From the foregoing description, the operation of the present invention should be apparent. When the tree trimmer of the present invention is to be employed, it is driven by the operator to the cite along a power line right-of-way where trees are growing over or near and even through the power lines. The vehicle 10 is driven so that the cutter head 39 is parallel to the vertical plane along which the limbs of the trees are to be cut. With the vehicle in this position, the lower boom 29 may be raised to its full upright position until stops 69 and 70 abutt, as shown in FIG. 9 and the hydraulic motor 56 actuated to rotate the gang saws. The hydraulic cylinder 36 may then be actuated raising the upper boom so that low limbs and underbrush immediately in front of the vehicle 10 may be cut to a height approximately that of the front axle of the vehicle. The operator would then continue to actuate cylinder 36 to raise the upper boom 31 to its uppermost position until stops 71 and 72 abutt so that the cutter head cuts an arcuate swath vertically through the tree limbs which extend across the vertical plane in which the cutter head is operating. The vehicle 10 is then moved slowly forward with the upper boom continuing to be raised and lowered and the cutter head cuts successive swaths through the overhanging tree limbs, branches, etc.

As indicated previously, since the gang saws extend above the edges of the cutter bar 39, cutting will take place by the saws extending above the cutter bar when the cutter head is moved vertically upward and conversely, below the cutter bar 41 when the cutter head is moving vertically downwardly. The upper boom may be moved alternatively upwardly and downwardly and the truck moved slowly forward so that the cutting action is done continuously, thereby increasing the productivity of the tree trimmer.

Should the operator encounter a rather thick branch extending at an odd angle to the vertical plane in which the limbs are to be cut, he may actuate the cylinder 45 to pivot the cutter head 39 so that it is at substantially right angles to the particular branch and thus cut the branch at more or less right angles.

Also, as previously indicated, should the terrain over which the vehicle is moving change so the vehicle is passing over the side of a hill, the tree trimmer base 22 may be moved about the pivots 63 and 64 so that the booms and cutter head lie in a vertical plane and thus the tree limbs may be trimmed in a substantially vertical plane even though the vehicle passes over hilly terrain.

Furthermore, since the axis 57 is located well forward of the front poriton 24 of the vehicle, and the cutting swath is well forward of the cab 15, branches and limbs that are cut fall in front of the vehicle for the most part so that the safety of the operator is enhanced.

It is seen from the foregoing description that a novel tree line trimmer is provided which is relatively simple to operate with the operator in a safe remote position on the vehicle to cut limbs in a verticle plane along a right of way in a wide sath with each stroke of the boom at greatly increased productivity.

I claim:

1. A right-of-way tree line trimmer comprising a vehicle having an operator's station, a boom assembly having multiple articulated parts located in a generally vertically extending principal cutting plane laterally offset from and generally parallel to a longitudinal axis of the vehicle, said articulated parts comprising pivot means mounted on said base member forming a first horizontal axis;

a lower boom, said pivot means supporting one end of said lower boom for pivotal movement relative to said first axis in said common plane; and an upper boom pivotally mounted to the other end of said lower boom pivotally mounted to the other end of said lower boom for vertical movement in said common plane about a second axis parallel to said first axis, each of said upper and lower booms having substantial length so that the combined length thereof is at least twice the length of the vehicle;

a first power means for pivotally moving the lower boom vertically relative to the base member, a second power means for pivotally moving the upper boom relative to the lower boom for at least 90° relative to the lower boom, an elongated cutter head, said cutter head including a plurality of circular saw blades, each saw blade mounted on a rotatable shaft which are mounted parallel to each other and in the same plane, said saw blades positioned in radially overlapping but axially offset relationship, and means for driving said saw blades, means for mounting one end of said cutter head to the outer end of said upper boom in longitudinal alignment with the upper boom, means to control the flow of fluid to said first and second power means to raise and lower said upper and lower booms either simultaneously or independently so that the cutter head may be moved in successive arcuate vertical swaths in said common plane to thereby cut tree limbs extending across the vertical plane in which the cutter head is operating.

2. A right-of-way tree line trimmer as claimed in claim 1, in which said upper and lower booms are of substantially equal length and a combined length of over 50 feet.

3. A right-of-way tree line trimmer as claimed in claim 1, in which said cutter head includes a housing, said rotatable shafts mounted within said housing with an end thereof projecting from one side of said housing, a saw blade mounted on the projecting end of each of said shafts, said saw blades extending above and below said housing, a first motor mounted on said housing and drive means interconnecting said first motor and each of the said shafts to rotate the shafts simultaneously.

4. A right-of-way tree line trimmer as claimed in claim 1 in which said first pivot axis mounted on said base member is located above the body of the vehicle.

5. A right-of-way tree line trimmer as claimed in claim 4 in which said base member is positioned at the front of the body of the vehicle and substantially forward of the front wheel axis of the vehicle to position said first pivot axis substantially forward of the front wheel axis of the vehicle.

6. A right-of-way tree line trimmer as claimed in claim 5 and which said base member is connected to one side of the vehicle and to one side of the operator's station in said cutting plane.

7. A right-of-way tree line trimmer as claimed in claim 6 in which the means for mounting the one end of the cutter head to the outer end of the upper boom is a pivot about which the cutter head may be moved between its position in longitudinal alignment with said upper boom and at least one position in which it extends perpendicular to said cutting plane and transversely in front of said vehicle so that, upon actuation of said second power means, the cutter head is moved relative to said lower boom in a vertical plane to cut tree limbs extending across the front of said vehicle.

8. A right-of-way tree line trimmer as claimed in claim 6 in which said base member is mounted on said vehicle for pivotable movement about a pivot axis extending longitudinally of the vehicle and located in said plane at said one side of the vehicle body, and further comprising power means for pivotably moving said base member.

9. A right-of-way tree line trimmer as claimed in claim 8 in which the base member includes downwardly extending projections located fore and aft of a front wheel axle of the vehicle, said projections including pivots forming said pivot axis.

10. A right-of-way tree line trimmer as claimed in claim 1 in which said means for mounting the cutter head to said upper boom includes a pivot axis about which the cutter head may be pivotally moved in a direction transversely of the length of said boom, and a fourth motor for moving said head in said transverse direction.

11. A right-of-way tree line trimmer as claimed in claim 6 in which said vehicle comprises a front section and a rear section, said front and rear sections being pivotally connected to form an articulated vehicle, power means for pivoting said front section and rear section relative to each other, said operator's station and said base member being mounted on said front section, and said longitudinal axis being referred to said front section.

* * * * *